US010176285B1

(12) United States Patent
Lundgren

(10) Patent No.: US 10,176,285 B1
(45) Date of Patent: Jan. 8, 2019

(54) SYSTEM, METHOD, AND COMPUTER PROGRAM PRODUCT FOR PROPERTY VIOLATION COMPREHENSION

(71) Applicant: Cadence Design Systems, Inc., San Jose, CA (US)

(72) Inventor: Lars Lundgren, Mölnlycke (SE)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 15/435,831

(22) Filed: Feb. 17, 2017

(51) Int. Cl.
*G06F 17/50* (2006.01)

(52) U.S. Cl.
CPC ........ *G06F 17/504* (2013.01); *G06F 17/5081* (2013.01)

(58) Field of Classification Search
CPC ............................ G06F 17/504; G06F 17/5081
See application file for complete search history.

(56) References Cited

U.S. PATENT DOCUMENTS

| 6,553,514 B1* | 4/2003 | Baumgartner | G01R 31/318357 703/13 |
|---|---|---|---|
| 6,751,582 B1* | 6/2004 | Andersen | G06F 17/504 703/14 |
| 6,904,423 B1* | 6/2005 | Nicolaou | G06N 5/02 702/22 |
| 6,944,838 B2* | 9/2005 | McMillan | G06F 17/504 703/14 |
| 6,957,404 B2* | 10/2005 | Geist | G06F 17/504 703/14 |
| 7,028,279 B2* | 4/2006 | Jain | G06F 17/504 716/106 |
| 7,159,198 B1* | 1/2007 | Ip | G06F 17/504 716/106 |
| 7,188,061 B2* | 3/2007 | Beer | G06F 17/504 703/22 |
| 7,260,800 B1* | 8/2007 | Koelbl | G06F 17/504 716/106 |
| 7,694,253 B2* | 4/2010 | Campos | G06F 17/5009 716/106 |
| 7,895,552 B1* | 2/2011 | Singhal | G06F 17/504 716/106 |
| 8,234,609 B2* | 7/2012 | Kurshan | G06F 17/504 716/106 |
| 8,448,111 B2* | 5/2013 | Mneimneh | G06F 17/5045 716/108 |

(Continued)

*Primary Examiner* — Naum B Levin
(74) *Attorney, Agent, or Firm* — Mark H. Whittenberger, Esq.; Holland & Knight LLP

(57) ABSTRACT

The present disclosure relates to a method for electronic design verification. Embodiments may include receiving, using at least one processor, an electronic design and identifying at least one property violation associated with the electronic design. Embodiments may further include generating a sensitivity path from an input to the at least one property violation. Embodiments may also include analyzing the electronic design to identify one or more of a portion of the electronic design that caused the at least one property violation, a portion of the electronic design that did not cause the at least one property violation, and a portion of the electronic design that has not been analyzed. Embodiments may further include applying at least one of a depth analysis and a breadth analysis to the sensitivity path.

17 Claims, 5 Drawing Sheets

(56) References Cited

U.S. PATENT DOCUMENTS

| | | | | |
|---|---|---|---|---|
| 8,656,330 B1* | 2/2014 | Kuehlmann | ............ | G06F 17/10 |
| | | | | 716/111 |
| 9,141,738 B2* | 9/2015 | Baransi | ................ | G06F 17/504 |
| 9,825,809 B2* | 11/2017 | Philip | ................ | H04L 41/0803 |
| 2017/0147719 A1* | 5/2017 | Martinez Canedo | ... | G06F 17/11 |
| 2017/0344685 A1* | 11/2017 | Ganzhorn | ........... | G06F 17/5054 |

* cited by examiner

| Complete Cause Overview for property dram.envr_inst.not_req_ack failing at cycle 10 | | | |
|---|---|---|---|
| not_req_ack: assert property (@( posedge dram_grclk) (~sctag0_dram_rd_req) (~sctag0_dram_rd_req \|=> ~dram_sctag0_rd_ack)); | | | |
| | coverage | out of | |
| Instances | 1.39% | 1078 | |
| Counters | 0.00% | 103 | |
| Inputs | 5.00% | | clspine_dram_tx_sync_global_shift_enable_sctag0_dram_rd_req |
| | | | dramct0.dram_l2if.ff_dram_sync_pulses.q dramct0.dram_l2if.ff_rd_ack0.q |
| | | | dramct0.dram_l2if.l2rdreqflop_cpu.q |
| | | | jbus_cluster_header_sync.sync_wrapper.dram_tx_synchronizer.lockup.so_1 |
| | | | jbus_cluster_header_sync.sync_wrapper.dram_tx_synchronizer.repeater.i0.q_r |
| | | | jbus_cluster_header_sync.sync_wrapper.dram_tx_synchronizer.syncff.i0.q_r |
| Register | 0.46% | | |
| Psms | 0.00% | 10 | |

FIG. 4

| Instance | Input coverage | Inputs | Output coverage | Outputs | Registers |
|---|---|---|---|---|---|
| dram(top) | | | | | |
| dramcifo | 5.56% | clkgate_dram_tx_sync_global_shift_enable_sctage0_dram_rd_req | 0.00% | | |
| dramcifo.dram_12if | 3.00% | dram_dram_tx_sync_sctng_dram_rd_req | 1.50% | dram_sctage_rd_ack | |
| dramcifo.dram_12if ff_dram_sync_pulses | 3.00% | dram_dram_tx_sync_sctng_dram_rd_req | 1.50% | dram_sctage_rd_ack | |
| dramcifo.dram_12if ff_dram_rd_ack0 | 50.00% | din | 100.00% | q | q |
| dramcifo.dram_12if l1delayflop_cpu | 33.00% | din | 100.00% | q | q |
| | 50.00% | din, sn | 100.00% | q | q |
| env_test | 40.00% | dram_sctage0_rd_ack_sctage0_dram_rd_req | 0.00% | | |
| jbus_cluster_header_sync | 2.50% | dram_tx_sync_global_se | 20.00% | dram_tx_sync_local | |
| jbus_cluster_header_sync.sync_wrapper | 2.50% | dram_tx_sync_global_se | 20.00% | dram_tx_sync_local | |
| jbus_cluster_header_sync.sync_wrapper.dram_tx_synchronizer | 40.00% | async_in_se | 50.00% | sync_out | |
| jbus_cluster_header_sync.sync_wrapper.dram_tx_synchronizer.lockup | 50.00% | sd | 100.00% | so | so_l |
| jbus_cluster_header_sync.sync_wrapper.dram_tx_synchronizer.repeater | 50.00% | d_se | 100.00% | q_so | |
| jbus_cluster_header_sync.sync_wrapper.dram_tx_synchronizer.repeater_io | 50.00% | d_se | 100.00% | q_so | |
| jbus_cluster_header_sync.sync_wrapper.dram_tx_synchronizer.syncff | 50.00% | d_sd | 50.00% | q | |
| jbus_cluster_header_sync.sync_wrapper.dram_tx_synchronizer.syncff_io | 50.00% | d_sd | 50.00% | q | q_i |
| test_stub_scan | 8.30% | global_shift_enable | 11.11% | se | |

FIG. 5

SYSTEM, METHOD, AND COMPUTER PROGRAM PRODUCT FOR PROPERTY VIOLATION COMPREHENSION

FIELD OF THE INVENTION

The present disclosure relates to electronic design verification, and more specifically, to a method for property violation comprehension.

DISCUSSION OF THE RELATED ART

Formal verification relies upon a system of constraints to communicate the legal state space to the proof engines. Existing technologies can be very helpful to understand why certain signals have certain values in a violation trace, but ultimately the guidance can become misleading rather than helpful, and for a bigger design it can be very hard to see the bigger picture. For example, the big picture may be lost when the high level end user problem "why does the property not hold?" is broken down to "why does the property fail in this violation trace?", and further broken down to "why does this signal have this value in this cycle?". In the first step a designer may commit to understand a specific example violation rather than the more general cause. In the second step a designer may commit to analyzing the value of specific signals over time without knowing if they are actually causing the failure or not.

SUMMARY OF DISCLOSURE

In one or more embodiments of the present disclosure, a computer-implemented method for electronic design verification. The method may include receiving, using at least one processor, an electronic design and identifying at least one property violation associated with the electronic design. The method may further include generating a sensitivity path from an input to the at least one property violation. The method may also include analyzing the electronic design to identify one or more of a portion of the electronic design that caused the at least one property violation, a portion of the electronic design that did not cause the at least one property violation, and a portion of the electronic design that has not been analyzed. The method may further include applying at least one of a depth analysis and a breadth analysis to the sensitivity path.

One or more of the following features may be included. In some embodiments, the depth analysis includes iteratively extracting control logic and generating one or more additional sensitivity paths. The breadth analysis may include differential analysis. Analyzing the electronic design may include analyzing one or more inputs, instances, and flip-flops. The method may further include displaying the sensitivity path at a graphical user interface. In some embodiments, displaying may include displaying at least one hierarchical edge bundle or instance tree at the graphical user interface. The method may further include allowing, at the graphical user interface, at least one of zooming, minimization, and collapsing of one or more aspects of the instance tree.

In one or more embodiments of the present disclosure a computer-readable storage medium having stored thereon instructions, which when executed by a processor result in one or more operations is provided. Operations may include receiving, using at least one processor, an electronic design and identifying at least one property violation associated with the electronic design. Operations may further include generating a sensitivity path from an input to the at least one property violation. Operations may also include analyzing the electronic design to identify one or more of a portion of the electronic design that caused the at least one property violation, a portion of the electronic design that did not cause the at least one property violation, and a portion of the electronic design that has not been analyzed. Operations may further include applying at least one of a depth analysis and a breadth analysis to the sensitivity path.

One or more of the following features may be included. In some embodiments, the depth analysis includes iteratively extracting control logic and generating one or more additional sensitivity paths. The breadth analysis may include differential analysis. Analyzing the electronic design may include analyzing one or more inputs, instances, and flip-flops. Operations may further include displaying the sensitivity path at a graphical user interface. In some embodiments, displaying may include displaying at least one hierarchical edge bundle or instance tree at the graphical user interface. Operations may further include allowing, at the graphical user interface, at least one of zooming, minimization, and collapsing of one or more aspects of the instance tree.

In one or more embodiments of the present disclosure, a system for electronic design verification is provided. The system may include one or more processors configured to receive an electronic design. The at least one processor may be further configured to identify at least one property violation associated with the electronic design and to generate a sensitivity path from an input to the at least one property violation. The at least one processor may be further configured to analyze the electronic design to identify one or more of a portion of the electronic design that caused the at least one property violation, a portion of the electronic design that did not cause the at least one property violation, and a portion of the electronic design that has not been analyzed. The at least one processor may be further configured to apply at least one of a depth analysis and a breadth analysis to the sensitivity path.

One or more of the following features may be included. In some embodiments, the depth analysis includes iteratively extracting control logic and generating one or more additional sensitivity paths. The breadth analysis may include differential analysis. Analyzing the electronic design may include analyzing one or more inputs, instances, and flip-flops. The at least one processor may be further configured to display the sensitivity path at a graphical user interface. Displaying may include displaying at least one hierarchical edge bundle or instance tree at the graphical user interface.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIGS. 4-5 are tables showing the cause coverage in tabular form.

DETAILED DESCRIPTION

Figure 1:
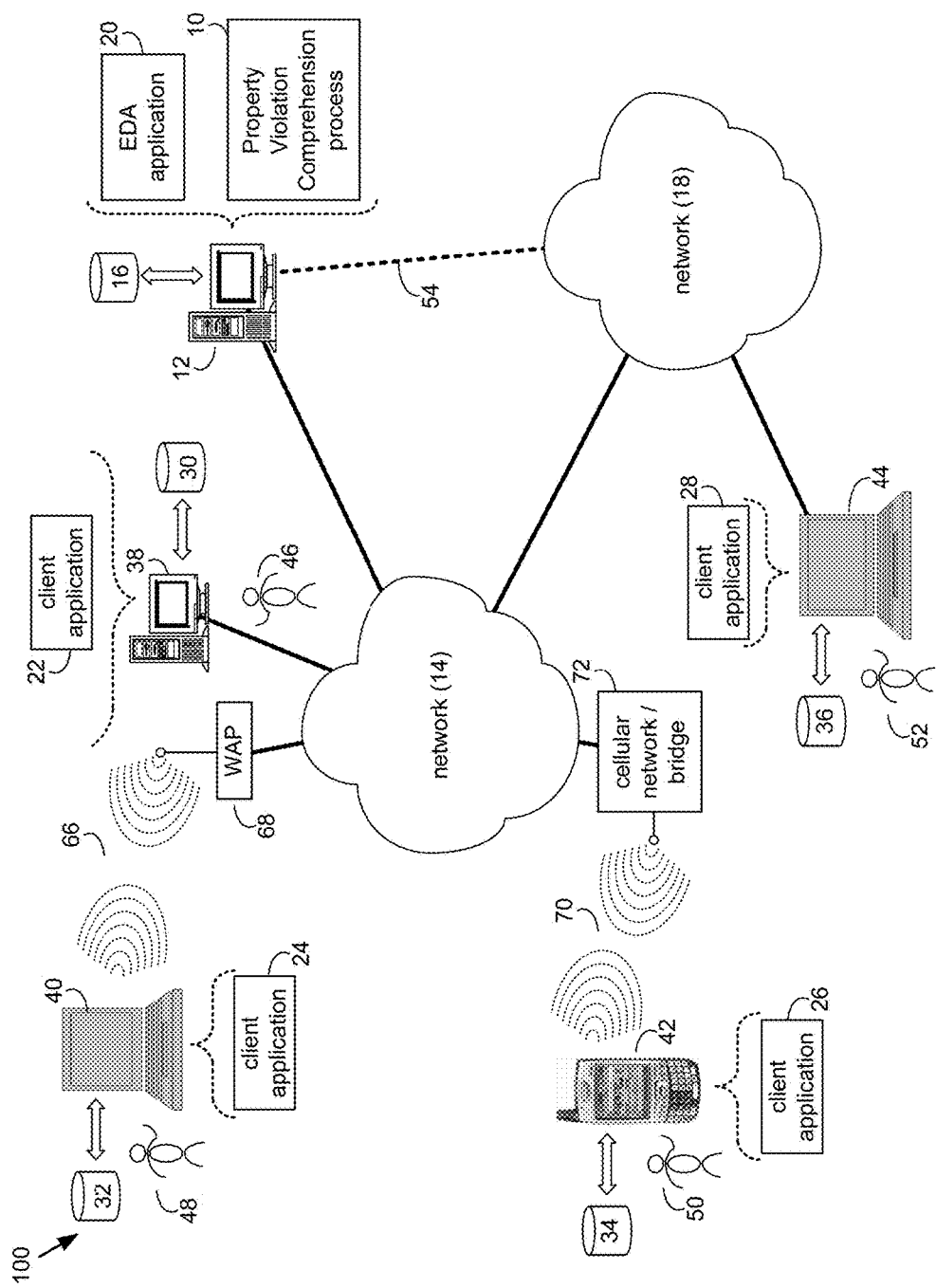
FIG. 1 is a diagram depicting an embodiment of a system in accordance with the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

As used in any embodiment described herein, "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

Any suitable computer usable or computer readable medium may be utilized. The computer readable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, $C^{++}$ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One or more hardware description languages may be used in accordance with the present disclosure. Some hardware description languages may include, but are not limited to, Verilog, VHDL, SystemC, SystemVerilogand Verilog-AMS. Various other hardware description languages may also be used as well.

Referring to FIG. 1, there is shown a verification process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, verification process 10 may reside on and be executed, in whole or in part, by a client electronic device, such as a personal computer, notebook computer, personal digital assistant, or the like.

The instruction sets and subroutines of verification process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types including but not limited, to hardware description language (HDL) files, which may contain the port type descriptions and executable specifications of hardware blocks.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Verification process 10 may be a stand alone application, or may be an applet/application/script that may interact with and/or be executed within EDA application 20. In addition/as an alternative to being a server-side process, verification process 10 may be a client-side process (not shown) that may reside on a client electronic device (described below) and may interact with an EDA client application (e.g., one or more of EDA client applications 22, 24, 26, 28). Further, verification process 10 may be a hybrid server-side/client-side process that may interact with EDA application 20 and an EDA client application (e.g., one or more of client applications 22, 24, 26, 28). As such, verification process 10 may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize verification process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (i.e., the computer that executes EDA application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
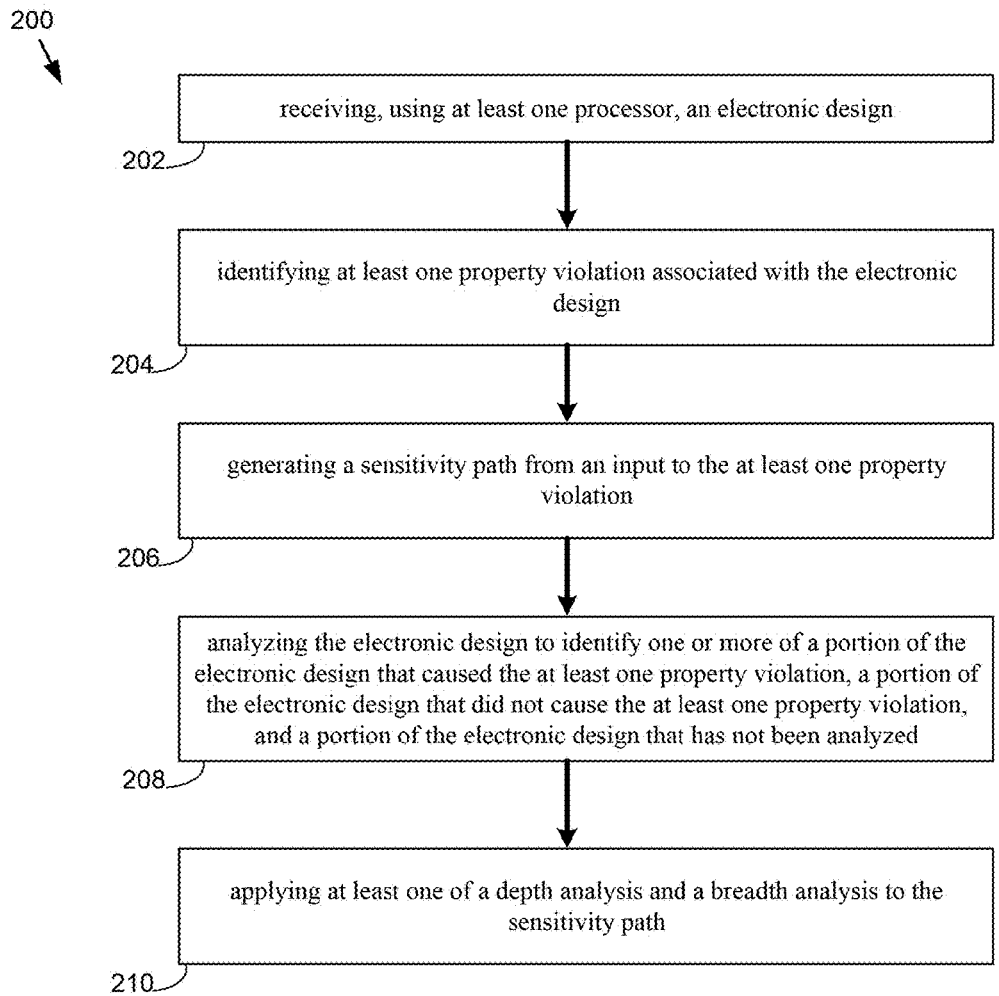
FIG. 2 is a flowchart depicting operations consistent with the verification process in accordance with an embodiment of the present disclosure.

Referring now to FIG. 2, an exemplary flowchart 200 depicting operations consistent with verification process 10 is provided. Embodiments may include receiving (202), using at least one processor, an electronic design and identifying (204) at least one property violation associated with the electronic design. Embodiments may further include generating (206) a sensitivity path from an input to the at least one property violation. Embodiments may also include analyzing (208) the electronic design to identify one or more of a portion of the electronic design that caused the at least one property violation, a portion of the electronic design that did not cause the at least one property violation, and a portion of the electronic design that has not been analyzed. Embodiments may further include applying (210) at least one of a depth analysis and a breadth analysis to the sensitivity path.

Embodiments of verification process 10 may be configured to perform property violation comprehension based on differential analysis and a new coverage metric, referred to herein as cause coverage and discussed in further detail herein below.

In some situations a designer may be faced with an assertion with a status counterexample ("cex" that could also be applied to a covered cover property, etc.). Often, the designer may need understand the nature, scope and cause of the cex, and the designer may want more guidance in this process than what is available using existing technologies. As discussed above, existing technologies can be very helpful to understand why certain signals have certain values in a violation trace, but ultimately the guidance can become misleading rather than helpful, and for a bigger design it can be very hard to see the bigger picture.

Figure 3:
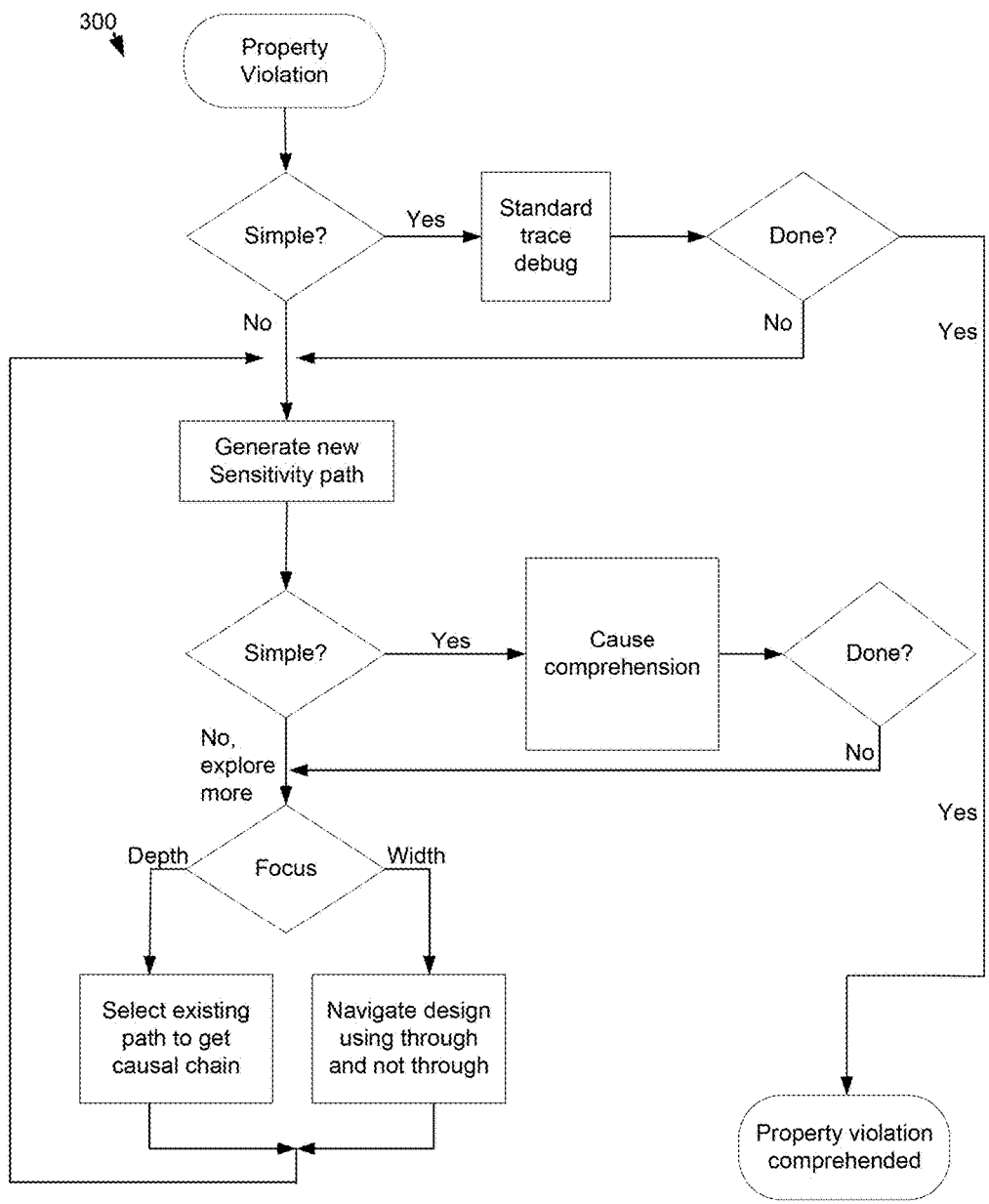
FIG. 3 is a diagram depicting an embodiment in accordance with the present disclosure.

In some embodiments, and referring also to FIG. 3, the recognition that a normal two valued violation trace may be understood as a deterministic failure may be based upon, at least in part, the concepts of a sensitivity path and the control logic associated with the sensitivity path. Each of these are discussed in further detail hereinbelow. In some embodiments, a sensitivity path (SP) may propagate an error token (E) with a polarity—from an input to a property failure. The control logic (CL) may be configured to keep the SP open.

In some embodiments, when faced with a "normal two valued violation trace" there are a number of possibilities. First, the violation may be independent of any input—any source of indeterminism. The violation may be deterministic. This is a simple cornercase that is usually simple to root cause. Second, the violation may be dependent of inputs, which may be a more challenging case. In this case it is always possible to find one specific input bit (several inputs could work, but embodiments included herein will focus on one at a time) that the property violation is directly sensitive to—such that keeping all other values fixed flipping the value of this input bit at a specific cycle makes the difference between the property passing and the property failing at the end of the trace. The value that makes the property pass is either zero or one. The other value makes the property fail. Embodiments included herein may consider the pair of values simultaneously as an error token, and can watch it propagate through the design—sometimes with positive polarity, sometimes with negative. The propagation may branch, but this example may focus on a single path that eventually reaches the property signal. This is referred to herein as a sensitivity path. The sensitivity path itself is a way to understand why the property does not hold—it is a cause for the property failure. A way to remove this cause is to change the RTL such that an error token is prevented from propagating all the way to the property along this path. In order to determine the difference between the error token being allowed to propagate or being blocked embodiments included herein may look at each component along the sensitivity path there can be a necessary condition for propagation. For example, for an OR-gate the condition is that the other input is 0. Such conditions for a sensitivity path may be referred to herein as its control logic.

Embodiments of verification process 10 may be configured to perform a depth analysis. Accordingly, control logic may be used as a target and new sensitivity paths and control logic may be obtained and iterated. In this way, embodiments of verification process 10 may move backwards along a causal chain. At each level a sensitivity path may open up the next level sensitivity path. This process may terminate when a path is reached that cannot be closed. Accordingly, embodiments of verification process 10 may provide a systematic and iterative approach to find a cause of a property violation represented by a (SP, CL) pair extracted from a differential trace to the property. Embodiments may include finding the cause for the cause by treating the conjunction of the conditions in the CL as a new differential analysis target, and from its trace the system may obtain a new (SP, CL) pair, etc. (e.g., moving backwards along a causal chain).

Embodiments of verification process 10 may be configured to perform a breadth analysis. Accordingly, the space of SPs may be explored using guided differential analysis checking the existence of SPs specifically going through, or not going through selected parts of the electronic design. In order to manage the cost, embodiments of verification process 10 may allow for the control of the granularity of the sensitivity analysis. For example, embodiments of verification process 10 may be configured to determine which primary inputs ("PIs") are possible, as well as which modules/instances the error token may pass through. In some embodiments, when focusing on the close fan in of the property signal, the process may determine where the error token may enter from (e.g. through a particular instance).

In some embodiments, the depth analysis may be configured to generate example causal chains exemplifying why the property does not hold. Ultimately it is an unguided depth first search in the space (e.g., tree shaped) of causes for a property violation. In contrast, the breadth analysis may use side conditions forcing the SPs to go through specific parts of the design, or to not go through specific parts of the design to guide the search in this space. This provides the ability to enumerate alternative causes at each causal level, and to conclude that certain elements of the design (specific instances, PIs, etc.) are completely off the hook they are not involved in causing the property to not hold in any way. The problem statement for the differential analysis may involve an X-propagation target that initially is the ok signal of the formal property verification ("FPV") property, and all inputs are x-sources and the nested searches uses the conjunction of the conditions in the CL as the X-propagation target. The breadth analysis may include an added side condition (e.g., through/not_through) used to force the search to learn the existence or non-existence of any causes for the property to be violated through specific parts of the design.

In some embodiments, verification process 10 may include not only PI cause coverage of the property violation but also for logic cause coverage measurement as well. As such, it may be applied to any signal or set of signals. For example, entire modules or instances as well, or the first flop boundary from the property, etc. It should be noted that PIs may serve as the entry-points for differentials as it is where the X enters. Internal points instead may allow the differential to pass through on its way to the property.

In some embodiments, by injecting X to selected PIs, the SP (sensitivity path) may be highlighted by the X value annotations with appropriate concrete CL non-X values (control logic). The cone of influence ("COI") driving the CL non-X values are not part of the traversal.

In some embodiments, conditional and unconditional Xs (positions on the sensitivity path) may refer to different values. It should be noted that the positions along the path where special conditions have to be (and are) satisfied in order to allow the X to pass through are of special importance. The conjunction of all such conditions along a SP—the CL—constitute a secondary X-propagation target signal. This is the cause for the cause, i.e., the second step in a causal chain. The CL is not at all the focus of the first iteration, but it is the primary focus of the second iteration.

In some embodiments, verification process 10 may include analyzing the electronic design to identify one or more of a portion of the electronic design that caused the at least one property violation, a portion of the electronic design that did not cause the at least one property violation, and/or a portion of the electronic design that has not been analyzed. Accordingly, for each level of granularity looking at the design (e.g., inputs, instances, flops, etc.) it may be divided into parts that are definitely covered (e.g., causing the property violation (on a sensitivity path), parts that are not causing the property violation (no sensitivity path possible) and parts that are not yet fully explored). In this way the scope of the property violation may be reviewed. This may allow the designer to identify whether or not the issue is a very local problem, or whether the cause cover a larger part of the design.

In some embodiments, dividing may include aggregating and summarizing the information gained above. It may also include lifting the perspective and presenting the information at a higher level such that trends and correlations become visible. An example focusing on the simplest level of granularity looking at the design just looking at the PIs is provided below. In this example the PIs are A, B, C, D, and E. Using the depth and breadth analysis described above it may have concluded that the PIs A and D are direct causes of the property violation, PI B is an indirect cause, PI C is not a cause, and the remaining PI E is still unknown. If we invested more effort in the breadth analysis we could eventually determine the cause status of E. We could say that the direct PI cause coverage of the property violation is A and D (40% of the inputs), and including the indirect causes we reach 60% and treating the unknowns pessimistically we reach 80% but we have learned 20% of the inputs are irrelevant to this property failing.

In some embodiments, when a PI (like A) is a direct cause it means that it may be possible to inject an error token an X—in that PI, and it can propagate all the way to the property forming a differential. As such, a difference only in the value of this PI at a single cycle can be the difference between the property failing and the property passing. We also have a differential trace to show it showing the entire differential and giving access to all the standard trace debug capabilities. When a PI (like b) is an indirect cause it may mean that even though it is not a direct cause in itself it can be the sole difference between a differential through a direct cause being able to reach the property or not. The indirect cause is causing a differential to the property to be open an indirect cause is satisfying all the controls logic such that the error toking is allowed to pass all the way to the property. It should be noted that the division exemplified above using PIs can be performed in any level of granularity looking at the design. For example, it may be possible to compute which instances in the instance tree can be direct or indirect causes, and which are non causes. Additionally and/or alternatively, the same computation may be performed at the gate level focusing on the logic nearest to the property itself In some embodiments, verification process 10 may include various display options. Some of these may include, but are not limited to, displaying the sensitivity path at a graphical user interface, displaying at least one hierarchical edge bundle or instance tree at the graphical user interface, and/or allowing, at the graphical user interface, at least one of zooming, minimization, and collapsing of one or more aspects of the instance tree. In some embodiments, all the SPs may be shown as hierarchical edge bundles on top of the instance tree using radial layout. Verification process 10 may be configured to allow zooming in/out in the tree, and collapsing non covered parts to obtain a big picture of a property violation. As a complement the present disclosure may list the causing modules, signals flops—and their percentages—further indicating how local the cause of the property violation may be. Accordingly, verification process 10 may be configured to present the information graphically as a graph overlayed on the radial instance tree map. In this way it may be possible to visualize parts of the design in certain colors (e.g., red, green, yellow, etc.), zoom in on parts of the instance tree, etc. FIGS. 4-5 depict two tables showing the cause coverage in table form.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method for electronic design verification comprising:
   receiving, using at least one processor, an electronic design;
   identifying at least one property violation associated with the electronic design;
   generating a sensitivity path from an input to the at least one property violation;
   analyzing the electronic design to identify a first portion of the electronic design that caused the at least one property violation, a second portion of the electronic design that did not cause the at least one property violation, and a third portion of the electronic design that has not been analyzed, wherein the first portion, the second portion, and the third portion differ;

applying at least one of a depth analysis and a breadth analysis to the sensitivity path; and displaying the sensitivity path at a graphical user interface, wherein the sensitivity path indicates why the at least on property violation occurred.

2. The computer-implemented method of claim 1, wherein the depth analysis includes iteratively extracting control logic and generating one or more additional sensitivity paths.

3. The computer-implemented method of claim 1, wherein the breadth analysis includes differential analysis.

4. The computer-implemented method of claim 1, wherein analyzing the electronic design includes analyzing one or more inputs, instances, and flip-flops.

5. The computer-implemented method of claim 1, wherein displaying includes displaying at least one hierarchical edge bundle or instance tree at the graphical user interface.

6. The computer-implemented method of claim 5, further comprising:

allowing, at the graphical user interface, at least one of zooming, minimization, and collapsing of one or more aspects of the instance tree.

7. A computer-readable storage medium for electronic design verification, the computer-readable storage medium having stored thereon instructions that when executed by a machine result in one or more operations, the operations comprising:

receiving, using at least one processor, an electronic design;

identifying at least one property violation associated with the electronic design;

generating a sensitivity path from an input to the at least one property violation;

analyzing the electronic design to identify a first portion of the electronic design that caused the at least one property violation, a second portion of the electronic design that did not cause the at least one property violation, and a third portion of the electronic design that has not been analyzed, wherein the first portion, the second portion, and the third portion differ;

applying at least one of a depth analysis and a breadth analysis to the sensitivity path; and displaying the sensitivity path at a graphical user interface, wherein the sensitivity path indicates why the at least on property violation occurred.

8. The computer-readable storage medium of claim 7, wherein the depth analysis includes iteratively extracting control logic and generating one or more additional sensitivity paths.

9. The computer-readable storage medium of claim 7, wherein the breadth analysis includes differential analysis.

10. The computer-readable storage medium of claim 7, wherein analyzing the electronic design includes analyzing one or more inputs, instances, and flip-flops.

11. The computer-readable storage medium of claim 7, wherein displaying includes displaying at least one hierarchical edge bundle or instance tree at the graphical user interface.

12. The computer-readable storage medium of claim 11, further comprising:

allowing, at the graphical user interface, at least one of zooming, minimization, and collapsing of one or more aspects of the instance tree.

13. A system for electronic design verification comprising:

a computing device having at least one processor configured to receive an electronic design, the at least one processor further configured to identify at least one property violation associated with the electronic design and to generate a sensitivity path from an input to the at least one property violation, the at least one processor further configured to analyze the electronic design to identify a first portion of the electronic design that caused the at least one property violation, a second portion of the electronic design that did not cause the at least one property violation, and a third portion of the electronic design that has not been analyzed, wherein the first portion, the second portion, and the third portion differ, the at least one processor further configured to apply at least one of a depth analysis and a breadth analysis to the sensitivity path, the at least one processor further configured to display the sensitivity path at a graphical user interface, wherein the sensitivity path indicates why the at least on property violation occurred.

14. The system of claim 13, wherein the depth analysis includes iteratively extracting control logic and generating one or more additional sensitivity paths.

15. The system of claim 13, wherein the breadth analysis includes differential analysis.

16. The system of claim 13, wherein analyzing the electronic design includes analyzing one or more inputs, instances, and flip-flops.

17. The system of claim 13, wherein displaying includes displaying at least one hierarchical edge bundle or instance tree at the graphical user interface.

\* \* \* \* \*